(12) United States Patent
Yang

(10) Patent No.: US 11,235,703 B2
(45) Date of Patent: Feb. 1, 2022

(54) VEHICLE GAS-DETECTING DEVICE

(71) Applicant: Vehicle-Plus International Ltd., Taichung (TW)

(72) Inventor: Cheng Yang, Taichung (TW)

(73) Assignee: VEHICLE-PLUS INTERNATIONAL LTD., Taichung (TW)

(*) Notice: Subject to any disclaimer, the term of this patent is extended or adjusted under 35 U.S.C. 154(b) by 0 days.

(21) Appl. No.: 17/363,038

(22) Filed: Jun. 30, 2021

(65) Prior Publication Data

US 2022/0001797 A1    Jan. 6, 2022

(30) Foreign Application Priority Data

Jul. 6, 2020 (TW) ................................ 109208601

(51) Int. Cl.
*B60Q 5/00* (2006.01)
*G08B 21/14* (2006.01)
*E05B 77/54* (2014.01)
*B60Q 9/00* (2006.01)
*G08B 21/18* (2006.01)

(52) U.S. Cl.
CPC ............... *B60Q 5/005* (2013.01); *B60Q 9/00* (2013.01); *E05B 77/54* (2013.01); *G08B 21/14* (2013.01); *G08B 21/182* (2013.01)

(58) Field of Classification Search
CPC .......... B60Q 5/005; B60Q 9/00; G08B 21/14; G08B 21/16; G08B 21/182; E05B 77/54
See application file for complete search history.

(56) References Cited

U.S. PATENT DOCUMENTS

| | | | | |
|---|---|---|---|---|
| 6,057,755 A | * | 5/2000 | Phillips | G01N 33/004 340/438 |
| 9,998,899 B1 | * | 6/2018 | Tannenbaum | G08B 21/0272 |
| 2006/0202815 A1 | * | 9/2006 | John | G08B 21/14 340/531 |
| 2011/0246022 A1 | * | 10/2011 | Bai | B60H 1/00771 701/36 |
| 2014/0074383 A1 | * | 3/2014 | Frey | G08B 21/14 701/110 |
| 2015/0022357 A1 | * | 1/2015 | Gettings | G08B 3/00 340/568.1 |
| 2016/0071388 A1 | * | 3/2016 | Levons | G08B 21/24 340/584 |
| 2018/0126950 A1 | * | 5/2018 | Aiderman | B60R 25/24 |
| 2018/0247526 A1 | * | 8/2018 | Pariseau | H04L 67/18 |
| 2018/0261069 A1 | * | 9/2018 | Honey-Jones | B60Q 1/50 |
| 2020/0001715 A1 | * | 1/2020 | Brown | B60Q 1/50 |
| 2020/0027337 A1 | * | 1/2020 | Cruz Huertas | G08B 13/00 |
| 2020/0114753 A1 | * | 4/2020 | Biderman | A61B 5/0002 |

* cited by examiner

*Primary Examiner* — Ojiako K Nwugo
(74) *Attorney, Agent, or Firm* — WPAT, PC

(57) ABSTRACT

A vehicle gas-detecting device includes a control unit, a gas-detecting unit, a warning unit, and a power-connecting unit. The gas-detecting unit is electrically connected to the control unit. The gas-detecting unit detects the concentration of a gas in a vehicle. The warning unit is electrically connected to the control unit. The power-connecting unit is electrically connected to the control unit and a power source of the vehicle. Thereby, when the concentration of the gas within the vehicle is greater than a predetermined threshold, the control unit activates the warning unit to give a warning to draw users' attention.

6 Claims, 3 Drawing Sheets

VEHICLE GAS-DETECTING DEVICE

BACKGROUND OF THE INVENTION

1. Field of the Invention

The present invention relates to a vehicle gas-detecting device for determining whether a gas within a vehicle exceeds a standard value and giving a warning when the result is positive.

2. Description of the Related Art

Drivers of cars often use air conditioning (A/C) function to protect themselves and their passengers from the polluted ambient air outside the car. However, since for this purpose the A/C function is in the air recycle mode and the in-car space (i.e., the chamber or the cab) forms a closed room, the concentration of oxygen in the air can decrease over time during a long-distance driving trip. A low oxygen concentration is known to be associated with drivers' feeling of fatigue and distraction, which are one of the major causes of traffic accidents.

Also, the closed space in a parked car tends to have a high temperature and a low oxygen concentration, and may cause danger to young children or pets that are left in the car unintentionally.

Hence, how to detect the concentration of a harmful gas in a car and give a warning when it comes to a dangerous level is an issue to be addressed by the present invention.

SUMMARY OF THE INVENTION

In order to address the foregoing issue, the present invention discloses a vehicle gas-detecting device, which detects the concentration of a gas within a vehicle, and give a warning when the concentration reaches a predetermined level to drawing a driver of the vehicle or other people.

Therefore, the present invention in one embodiment provides a vehicle gas-detecting device, which comprises a control unit, a gas-detecting unit, a warning unit, and a power-connecting unit. The gas-detecting unit is electrically connected to the control unit. The gas-detecting unit is configured to detect the concentration of a gas within a vehicle. The warning unit is electrically connected to the control unit. The power-connecting unit is electrically connected to the control unit and a power source of the vehicle. When the concentration of the gas within the vehicle is greater than a predetermined threshold, the control unit activates the warning unit to give a warning.

Thereby, the present invention can timely warn the driver of the vehicle or other people and prevent the related safety threat.

DETAILED DESCRIPTION OF THE INVENTION

The following preferred embodiments when read with the accompanying drawings are made to clearly exhibit the above-mentioned and other technical contents, features and effects of the present invention. Unless otherwise noted, like elements will be identified by identical numbers throughout the embodiments.

Figure 1:
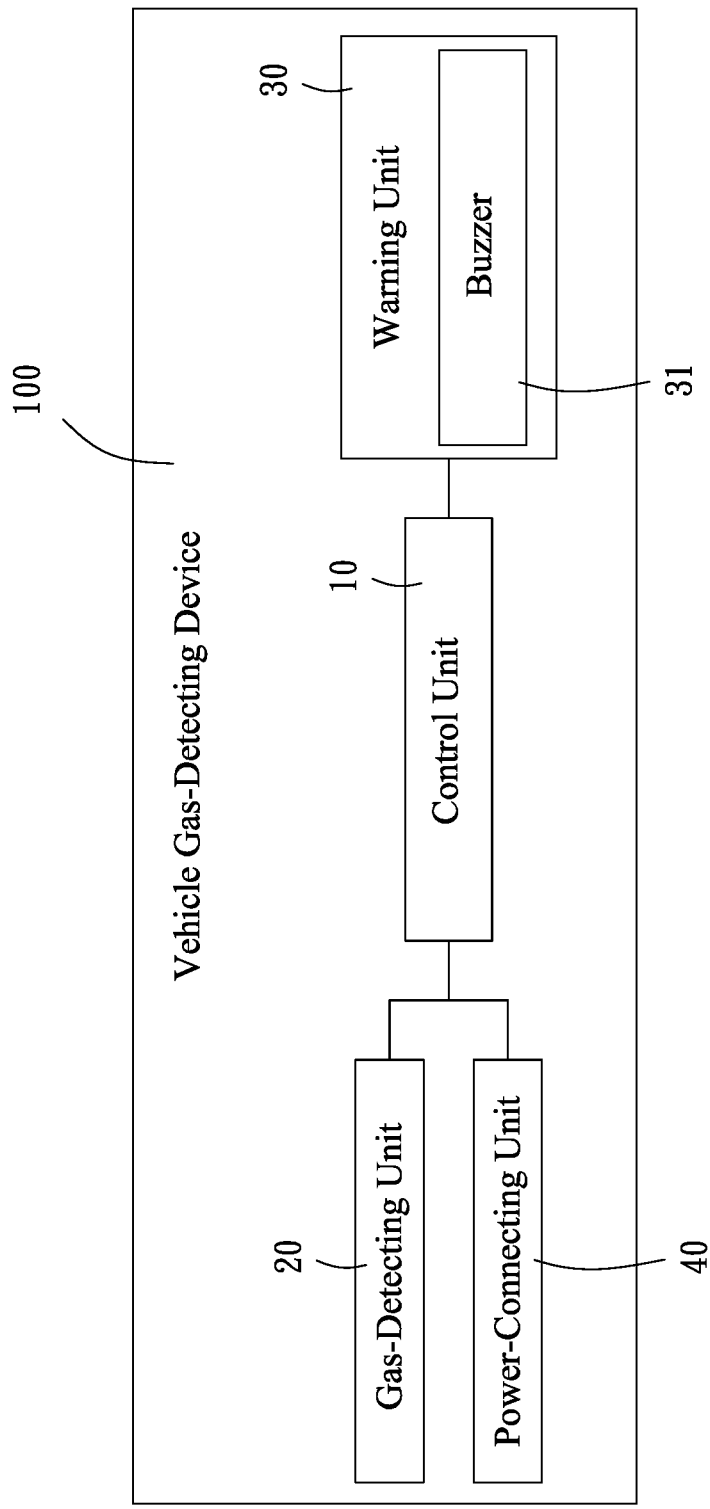
FIG. 1 is a schematic block diagram of a vehicle gas-detecting device according to a first embodiment of the present invention.

Referring to FIG. 1, a vehicle gas-detecting device 100 according to the first embodiment of the present invention comprises a control unit 10, a gas-detecting unit 20, a warning unit 30, and a power-connecting unit 40. In the first embodiment of the present invention, the vehicle gas-detecting device 100 is portable and can be detachably installed in or detached from a space in a vehicle. Herein, the space means a chamber or a cab of the vehicle.

The control unit 10 is pre-stored with a predetermined threshold.

The gas-detecting unit 20 is electrically connected to the control unit 10. The gas-detecting unit 20 is configured to detect a concentration of a gas within a vehicle. Therein, the gas for the gas-detecting unit 20 to detect is one of carbon monoxide and carbon dioxide. The gas-detecting unit 20 uses one or more sensors to detect the gas. In implementation where only a single sensor is used, one specific gas is to be detected. In implementation where multiple sensors are used, more gases can be monitored simultaneously. The present invention places no limitations to the number and the type(s) of the used sensor(s).

The warning unit 30 is electrically connected to the control unit 10. The warning unit 30 includes a buzzer 31.

The power-connecting unit 40 is electrically connected to the control unit 10 and a power source of the vehicle. The power-connecting unit 40 may be a car charger plug or USB connector. The power-connecting unit 40 is freely pluggable to the vehicle. When plugged, it allows the vehicle gas-detecting device 100 to be powered by the power source (i.e., a battery) of the vehicle, and is off as the vehicle is turned off.

When the vehicle gas-detecting device 100 is placed in the vehicle and is electrically connected to and in turn powered by the charger socket in the vehicle through the power-connecting unit 40, it can activate the gas-detecting unit 20 to perform gas detection in the vehicle. As a result of the operation of the gas-detecting unit 20, if the concentration of a specific gas within a vehicle is greater than a predetermined threshold, the control unit 10 activates the warning unit 30 to give a warning, in the form of, for example, a buzz, to inform the driver the vehicle or other people that the concentration of carbon monoxide or carbon dioxide in the chamber/cab of the vehicle is improperly high, and the driver or the relevant people have to open car windows or leave the car to prevent the danger.

Figure 2:
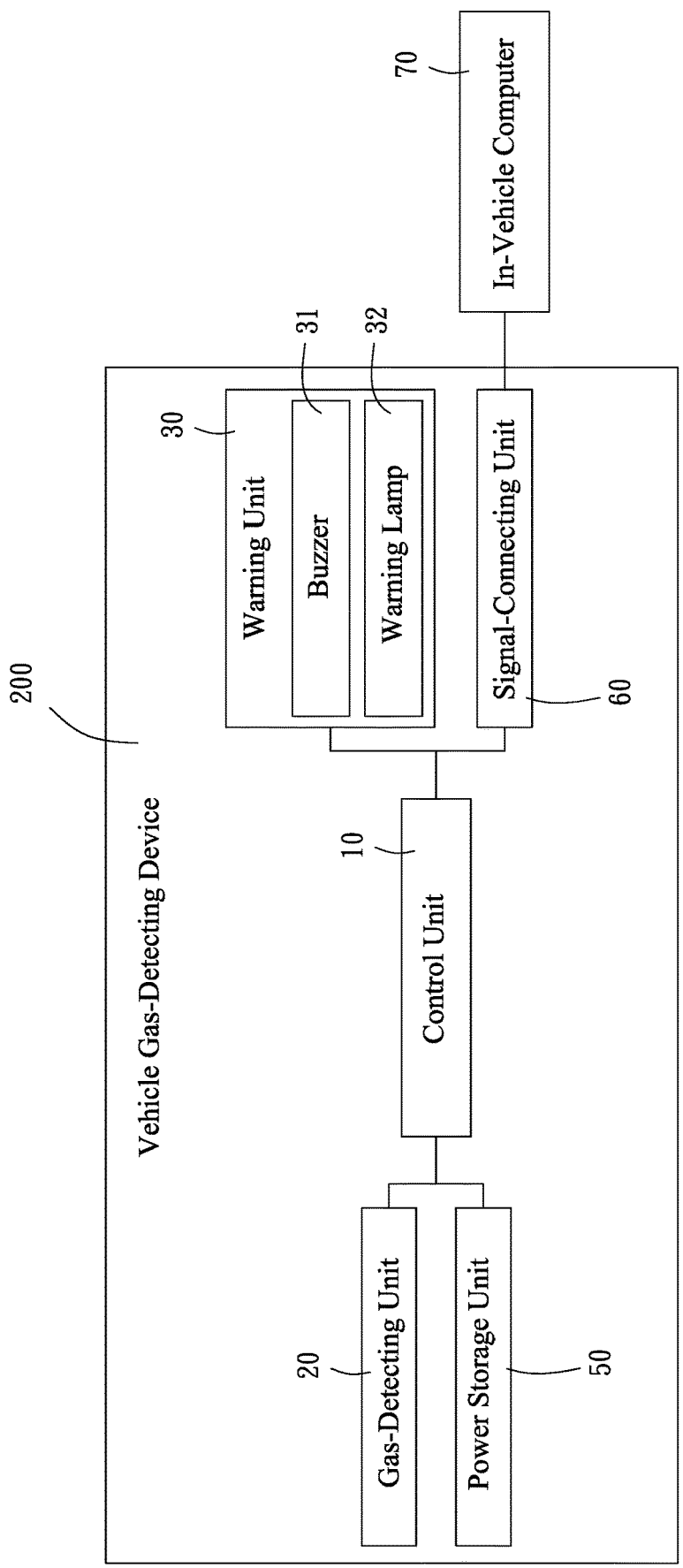
FIG. 2 is a schematic block diagram of a vehicle gas-detecting device according to a second embodiment of the present invention.

FIG. 2 depicts a vehicle gas-detecting device 200 according to the second embodiment of the present invention. Different from its counterpart as described with reference to the first embodiment, the vehicle gas-detecting device 200 further comprises a power storage unit 50, which is electrically connected to the control unit 10 and the power source of the vehicle. The power storage unit 50 is configured to be charged by the power source (i.e., a battery) of the vehicle, so that even when vehicle is turned off, the vehicle gas-detecting device 200 can continue to function. Therein, the power storage unit 50 may be a lithium battery, and the control unit 10 is pre-stored with a first predetermined threshold and a second predetermined threshold. The first predetermined threshold is greater than the second predetermined threshold.

Thereby, during operation of the vehicle, once the concentration of the gas within the vehicle is greater than the first predetermined threshold, the control unit 10 activates the warning unit 30 to give a warning, thereby drawing the driver's or other people's attention. When the vehicle has been turned off and the concentration of the gas within the vehicle is greater than the second predetermined threshold, the control unit 10 activates the warning unit 30 to give a warning. The design that the first predetermined threshold is greater than the second predetermined threshold means that a warning will be trigger earlier when the vehicle is turned off than when the vehicle is in operation, so as to give an early warning and leave enough time for relevant people to avert the danger caused by the harmful gas.

In the present embodiment, the warning unit 30 further comprises a warning lamp 32 that is deposited in the dashboard of the vehicle, so as to, in addition to the acoustical warning as described previously, give a visual warning in the form of, for example, blinking light.

In the present embodiment, there is further a signal-connecting unit 60, which is in signal connection with an in-vehicle computer 70. When the concentration of the gas within the vehicle is greater than the second predetermined threshold, the in-vehicle computer 70 triggers a door-opening signal, which allows the locked doors of the vehicle to be open from outside. This is particularly useful when a pet or a young child is left in the vehicle and needs to be rescued by others.

In another embodiment, in virtue of the signal connection between the signal-connecting unit 60 and the in-vehicle computer 70, when the concentration of the gas within the vehicle is greater than the second predetermined threshold, the in-vehicle computer 70 can trigger an anti-theft function pre-existing in the vehicle. Such a cooperation means that when an intruder breaks into the vehicle and unavoidably changes the concentration of the specific gas in the vehicle, the anti-theft function of the vehicle can be triggered to warn of the invasion.

Figure 3:
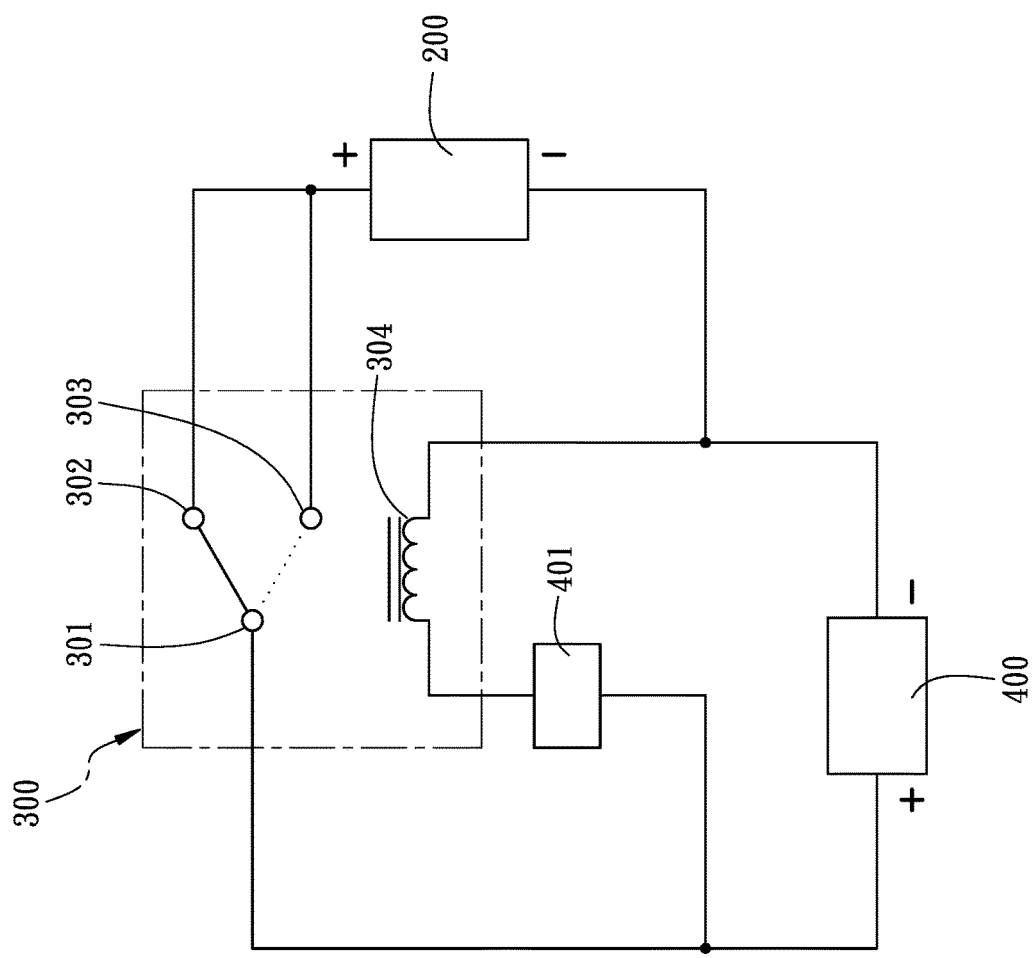
FIG. 3 is a circuit diagram illustrating how the vehicle gas-detecting device of the present invention is connected to a car battery through a 5-pin relay.

FIG. 3 is a circuit diagram illustrating how the vehicle gas-detecting device 200 of the present invention is connected to a car battery 400 using a 5-pin relay 300. Therein, the circuit between a first contact 301 and a second contact 302 of the 5-pin relay 300 is normally closed, while the circuit between the first contact 301 and the third contact 303 is normally open. When the vehicle is turned off, the normally closed circuit between the first contact 301 and the second contact 302 allows the vehicle gas-detecting device 200 to remain electrically connected to the battery 400 and continue to perform gas detection. Then when a start switch 401 (or an ignition) of the vehicle is operated, a working coil 304 connects the first contact 301 and the third contact 303 while disconnecting the first contact 301 from the second contact 302, so that the concentration of the gas within the chamber/cab of the vehicle can be monitored during the vehicle's operation. Thereby, the disclosed vehicle gas-detecting device 200 employs the 5-pin relay 300 that is electrically connected to the battery 400 to maintain its power supply and operability no matter the vehicle is started or off.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A vehicle gas-detecting device, comprising:
   a control unit;
   a gas-detecting unit, electrically connected to the control unit and configured to detect a concentration of a gas within a vehicle;
   a warning unit, electrically connected to the control unit; and
   a power storage unit, electrically connected to the control unit and a power source of the vehicle, wherein the power storage unit is configured to be charged by the power source of the vehicle;
   whereby when the concentration of the gas within the vehicle is greater than a first predetermined threshold, the control unit activates the warning unit to give a warning;
   and when the vehicle has been turned off and the concentration of the gas within the vehicle is greater than a second predetermined threshold, the control unit activates the warning unit to give the warning, in which the first predetermined threshold is greater than the second predetermined threshold.

2. The vehicle gas-detecting device of claim 1, further comprising a signal-connecting unit, which is in signal connection with an in-vehicle computer, whereby when the concentration of the gas within the vehicle is greater than the second predetermined threshold, a door-opening signal is triggered.

3. The vehicle gas-detecting device of claim 1, further comprising a signal-connecting unit, which is in signal connection with an in-vehicle computer, whereby when the concentration of the gas within the vehicle is greater than the second predetermined threshold, the in-vehicle computer triggers an anti-theft function.

4. The vehicle gas-detecting device of claim 1, wherein the gas-detecting unit is configured to detect one of carbon monoxide and carbon dioxide.

5. The vehicle gas-detecting device of claim 1, wherein the warning unit includes a buzzer.

6. The vehicle gas-detecting device of claim 5, wherein the warning unit includes a warning lamp that is deposited in a dashboard of the vehicle, and the power storage unit is a lithium battery, while the first predetermined threshold and the second predetermined threshold are set by the control unit.

* * * * *